United States Patent
Liu et al.

(10) Patent No.: US 11,681,652 B2
(45) Date of Patent: Jun. 20, 2023

(54) METHODS, ELECTRONIC DEVICES AND COMPUTER PROGRAM PRODUCTS FOR ACCESSING DATA

(71) Applicant: EMC IP Holding Company LLC, Hopkinton, MA (US)

(72) Inventors: Qin Liu, Chengdu (CN); Jie Liu, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 147 days.

(21) Appl. No.: 16/838,484

(22) Filed: Apr. 2, 2020

(65) Prior Publication Data

US 2021/0173814 A1 Jun. 10, 2021

(30) Foreign Application Priority Data

Dec. 6, 2019 (CN) .......................... 201911244915.6

(51) Int. Cl.
*G06F 16/14* (2019.01)
*G06F 11/14* (2006.01)
*G06F 16/16* (2019.01)
*G06F 16/188* (2019.01)

(52) U.S. Cl.
CPC ........ *G06F 16/148* (2019.01); *G06F 11/1448* (2013.01); *G06F 16/16* (2019.01); *G06F 16/188* (2019.01)

(58) Field of Classification Search
CPC ...... G06F 16/148; G06F 16/188; G06F 16/16; G06F 11/1448
USPC ........................................................ 707/770
See application file for complete search history.

(56) References Cited

U.S. PATENT DOCUMENTS

| 5,603,019 A | * | 2/1997 | Kish ....................... G06F 16/10 707/757 |
| 5,778,395 A | * | 7/1998 | Whiting .............. G06F 11/1464 |
| 5,948,062 A | * | 9/1999 | Tzelnic ............... H04L 67/2842 709/219 |
| 6,061,770 A | * | 5/2000 | Franklin ............. G06F 11/1466 711/161 |
| 6,161,111 A | * | 12/2000 | Mutalik ................ G06F 3/0619 707/823 |

(Continued)

FOREIGN PATENT DOCUMENTS

| CN | 109983431 A | * | 7/2019 | ............. G06F 12/08 |
| EP | 1975799 A2 | * | 10/2008 | .......... G06F 11/1448 |

*Primary Examiner* — Phuong Thao Cao
(74) *Attorney, Agent, or Firm* — Womble Bond Dickinson (US) LLP

(57) ABSTRACT

Embodiments of the present disclosure provide methods, electronic devices and computer program products for accessing data. A method comprises receiving, at a first device, a file system operation request for accessing target data, the target data being stored at a second device after being pre-processed, and the first device providing a file system interface for data stored at the second device; forwarding the file system operation request to the second device, such that the target data is restored at the second device; receiving the restored target data from the second device; and providing the target data as a response to the file system operation request. Embodiments of the present disclosure allow users to access backup data stored after being pre-processed through normal file system operations and can achieve high data access performance.

20 Claims, 7 Drawing Sheets

(56) References Cited

U.S. PATENT DOCUMENTS

| | | | |
|---|---|---|---|
| 7,496,783 B1* | 2/2009 | Graf | G06F 11/1469 714/4.11 |
| 7,610,285 B1* | 10/2009 | Zoellner | G06F 16/16 |
| 8,234,250 B1* | 7/2012 | Sharma | G06F 16/174 707/649 |
| 8,732,479 B1* | 5/2014 | Henriksen | G06F 11/1448 709/201 |
| 8,832,030 B1* | 9/2014 | Buchman | G06F 11/1469 707/650 |
| 9,176,824 B1* | 11/2015 | Henriksen | G06F 21/56 |
| 9,239,762 B1* | 1/2016 | Gunda | G06F 16/188 |
| 9,239,840 B1* | 1/2016 | Acharya | G06F 16/164 |
| 9,678,968 B1* | 6/2017 | Taylor | G06F 3/0608 |
| 9,734,156 B1* | 8/2017 | Bajpai | G06F 16/1752 |
| 9,792,298 B1* | 10/2017 | Taylor | G06F 16/1844 |
| 9,804,928 B2* | 10/2017 | Davis | G06F 3/0613 |
| 9,824,095 B1* | 11/2017 | Taylor | G06F 11/1458 |
| 10,095,710 B1* | 10/2018 | Whitmer | G06F 11/1469 |
| 10,275,321 B1* | 4/2019 | Bajaj | G06F 16/188 |
| 11,036,683 B2* | 6/2021 | Jha | G06F 16/1734 |
| 2005/0216788 A1* | 9/2005 | Mani-Meitav | G06F 11/1464 714/6.32 |
| 2007/0179997 A1* | 8/2007 | Nooning, III | G06F 11/1458 |
| 2008/0034004 A1* | 2/2008 | Cisler | G06F 11/1448 |
| 2010/0262585 A1* | 10/2010 | Rosikiewicz | G06F 16/10 707/679 |
| 2011/0125720 A1* | 5/2011 | Jayaraman | G06F 16/1748 707/E17.005 |
| 2012/0047109 A1* | 2/2012 | Hayashi | G06F 11/1469 707/E17.007 |
| 2013/0117240 A1* | 5/2013 | Taylor | G06F 16/182 707/690 |
| 2014/0006357 A1* | 1/2014 | Davis | G06F 16/182 707/667 |
| 2014/0007239 A1* | 1/2014 | Sharpe | G06F 16/137 726/24 |
| 2017/0316025 A1* | 11/2017 | Shekhar | G06F 16/168 |
| 2018/0107563 A1* | 4/2018 | Bender | G06F 16/148 |
| 2018/0139208 A1* | 5/2018 | Ho | G06F 3/067 |
| 2021/0042194 A1* | 2/2021 | Bode | G06F 11/1451 |

* cited by examiner

METHODS, ELECTRONIC DEVICES AND COMPUTER PROGRAM PRODUCTS FOR ACCESSING DATA

CROSS-REFERENCE TO RELATED APPLICATION

This patent application claims priority, under 35 U.S.C. § 119, of Chinese Patent Application No. 201911244915.6, filed Dec. 6, 2019, which is incorporated by reference herein in its entirety.

FIELD

Embodiments of the present disclosure generally relate to the field of data storage, and more specifically, to methods, electronic devices and computer program products for accessing data.

BACKGROUND

To avoid data loss, customers usually save files to a backup system. A backup system usually includes a backup client and a backup server, where the backup client may send files to the backup server for backup. To save storage resources, the backup client may usually pre-process a file to be backed up, for example, by dividing the file into a plurality of data chunks, and then encrypting and compressing these data chunks. When storing a pre-processed chunk to the backup server, the backup client may calculate a hash value of the chunk as an index of the chunk. Since the file is stored at the backup server as pre-processed chunks, it usually cannot be directly browsed and accessed by other devices or applications.

SUMMARY

Embodiments of the present disclosure provide methods, apparatuses and computer program products for accessing data.

In a first aspect of the present disclosure, there is provided a method for accessing data. The method comprises receiving, at a first device, a file system operation request for accessing target data, the target data being stored at a second device after being pre-processed, and the first device providing a file system interface for data stored at the second device; forwarding the file system operation request to the second device, such that the target data is restored at the second device; receiving the restored target data from the second device; and providing the target data as a response to the file system operation request.

In a second aspect of the present disclosure, there is a method for accessing data. The method comprises receiving, from a first device and at a second device, a file system operation request for accessing target data, the target data being stored in a data repository of the second device after being pre-processed, and the first device providing a file system interface for data stored in the data repository; restoring the target data from the data repository; and sending the restored target data to the first device.

In a third aspect of the present disclosure, there is provided an electronic device for accessing data. The device comprises at least one processing unit and at least one memory. The at least one memory is coupled to the at least one processing unit and stores instructions for execution by the at least one processing unit. The instructions, when executed by the at least one processing unit, cause the device to perform acts comprising: receiving a file system operation request for accessing target data, the target data being stored at a second device after being pre-processed, and the electronic device providing a file system interface for data stored at the second device; forwarding the file system operation request to the second device, such that the target data is restored at the second device; receiving the restored target data from the second device; and providing the target data as a response to the file system operation request.

In a fourth aspect of the present disclosure, there is provided an electronic device for accessing data. The device comprises at least one processing unit and at least one memory. The at least one memory is coupled to the at least one processing unit and stores instructions for execution by the at least one processing unit. The instructions, when executed by the at least one processing unit, cause the device to perform acts comprising: receiving, from a first device, a file system operation request for accessing target data, the target data being stored in a data repository of the electronic device after being pre-processed, and the first device providing a file system interface for data stored in the data repository; restoring the target data from the data repository; and sending the restored target data to the first device.

In a fifth aspect of the present disclosure, there is provided a computer program product tangibly stored on a non-transitory computer-readable medium and comprising machine-executable instructions that, when executed by a device, cause the device to perform the method according to the first aspect of the present disclosure.

In a sixth aspect of the present disclosure, there is provided a computer program product tangibly stored on a non-transitory computer-readable medium and comprising machine-executable instructions that, when executed by a device, cause the device to perform the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description on the example embodiments of the present disclosure with reference to the accompanying drawings in which the same reference symbols refer to the same components.

Throughout the drawings, the same or similar reference symbols refer to the same or similar elements.

DETAILED DESCRIPTION OF EMBODIMENTS

Figure 1A:
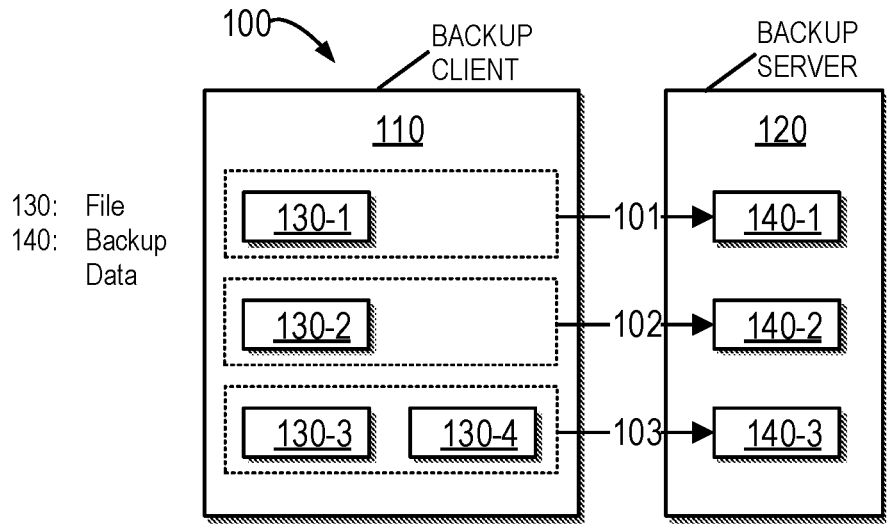
FIG. 1A illustrates a block diagram of a backup system according to a conventional scheme.

Preferred embodiments of the present disclosure will now be described in more detail with reference to the drawings. Although the preferred embodiments of the present disclosure are illustrated in the drawings, it should be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As described above, to avoid data loss, customers usually save files to a backup system. A backup system usually includes a backup client and a backup server, where the backup client may send files to the backup server for backup.

FIG. 1A illustrates a block diagram of a backup system according to a conventional scheme. As shown in FIG. 1A, the backup system 100 may include a backup client 110 and a backup server 120. The backup client 110 may initiate a backup task to back up files at the backup client 110 to the backup server 120. For example, by means of a backup task 101, the backup client 110 may back up a file 130-1 to the backup server 120, and the backup server 120 may store backup data 140-1 corresponding to the file 130-1. By means of a backup task 102, the backup client 110 may back up a file 130-2 to the backup server 120, and the backup server 120 may store backup data 140-2 corresponding to the file 130-2. By means of a backup task 103, the backup client 110 may back up files 130-3 and 130-4 to the backup server 120, and the backup server 120 may store backup data 140-3 corresponding to the files 130-3 and 130-4.

Figure 1B:
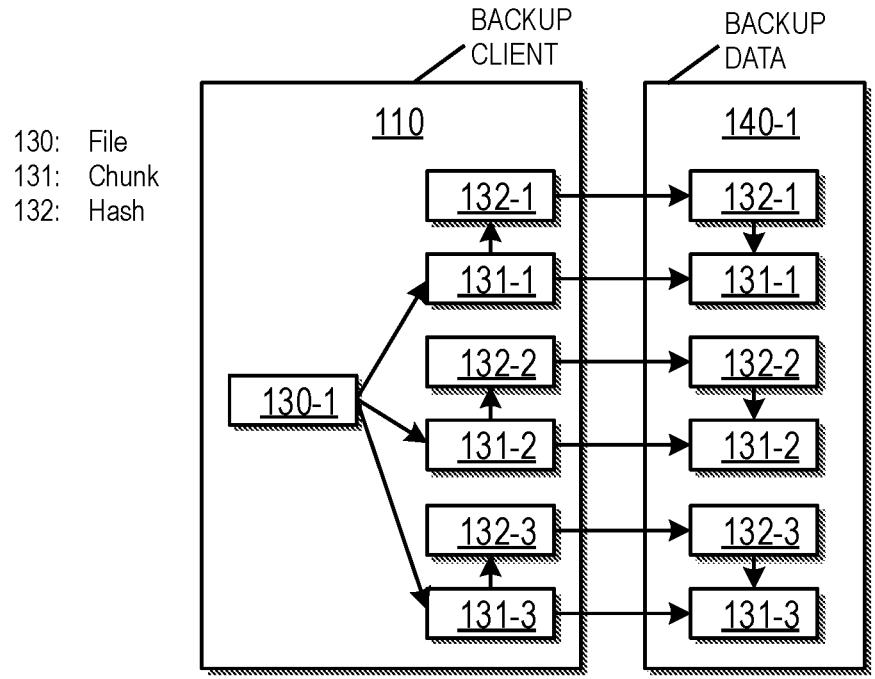
FIG. 1B illustrates a schematic diagram of data backup according to the conventional scheme.

FIG. 1B illustrates a schematic diagram of data backup according to the conventional scheme by taking the backup task 101 as an example. As shown in FIG. 1B, in order to save storage resources, the backup client 130-1 may pre-process the file 130-1. For example, the backup client 130-1 may divide the file 130-1 into a plurality of chunks 131-1, 131-2, and 131-3, and then encrypt and compress these chunks 131-1, 131-2, and 131-3. When storing the pre-processed chunks to the backup server 120, the backup client 130-1 may calculate respective hash values 132-1, 132-2, and 132-3 of the chunks 131-1, 131-2, and 131-3 as respective indexes of these chunks. The backup client 130-1 may store the chunks 131-1, 131-2, and 131-3 corresponding to the file 130-1 and their respective hash values 132-1, 132-2, and 132-3 as the backup data 140-1.

As can be seen from FIGS. 1A and 1B, since a file stored at the backup server 120 as pre-processed chunks, it cannot be directly browsed and accessed by other devices or applications.

Some traditional solutions implement access to backed up files by restoring multiple chunks corresponding to the file into a file. However, this access is on a file-by-file basis. Even if the data to be accessed is only a small part of the file, the entire file needs to be restored, resulting in poor access performance. If a user wants to compare the differences between different backup versions of the same file, the user needs to find different versions of the file in different backups and then restore these versions of the files separately, which is very inconvenient. If a user wants to view contents within a virtual machine backup, the user needs to use the file-level recovery so as to browse the contents in the virtual disk by a folder name or a file name. The user then needs to restore one or more files at a location he/she wants to access. Due to the complicated process of the file-level recovery, the access usually takes longer than the normal file access.

Embodiments of the present disclosure propose a solution for accessing data to solve the above problems and/or other potential problems. This solution implements a virtual file system interface for backup data stored at a backup server. This interface allows other devices or applications to access data stored after being pre-processed through normal file system operations. This solution can achieve fine-grained access to backup files and can achieve high data access performance.

Figure 2:
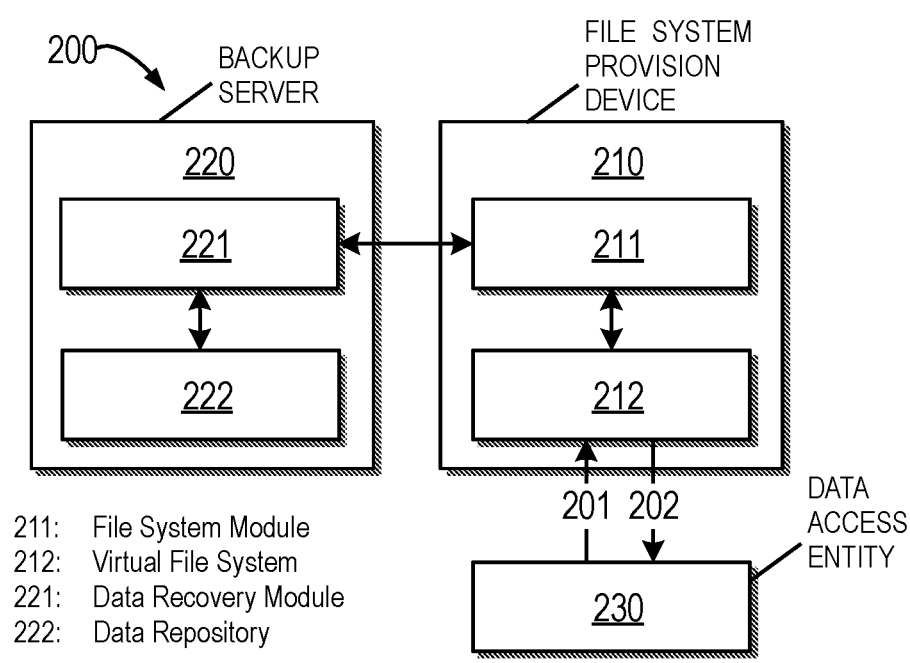
FIG. 2 illustrates a block diagram of a data access system according to embodiments of the present disclosure.

FIG. 2 illustrates a block diagram of a data access system 200 according to embodiments of the present disclosure. It is to be understood that the structure of the data access system 200 is shown merely for the purpose of illustration, without suggesting any limitation to the scope of the present disclosure.

As shown in FIG. 2, the data access system 200 may include a file system provision device 210 (also referred to herein as a "first device"), a backup server 220 (also referred to herein as a "second device") and a data access entity 230 (for example, a third-party application, a device, a system, or a user, etc.). Similar to the backup server 120 shown in FIG. 1A, the backup server 220 is configured to store backup data from backup clients. The file system provision device 210 is configured to provide a file system interface for the backup data stored at the backup server 220. The data access entity 230 may access the backup data stored at the backup server 220 via the file system interface provided by the file system provision device 210.

In some embodiments, the file system provision device 210 may include a virtual file system 212 and a user space file system (FUSE) module 211. The virtual file system 212 may provide the file system interface for the backup data stored at the backup server 220, thereby allowing other devices or applications to access the backup data stored at the backup server 220 through ordinary file system operations. The FUSE module 211 can implement user-customized file system access. For example, when implemented based on the Linux operating system, the FUSE module 211 may include a FUSE kernel module, a FUSE interface module (e.g., libfuse), and a FUSE application.

In some embodiments, as shown in FIG. 2, when the data access entity 230 initiates 201 a file system operation request for accessing backup data through the file system interface provided by the virtual file system 212 (for example, reading a backup file or viewing a list of backup files, etc.), the file system operation request may first be passed from the virtual file system 212 in the kernel space to the kernel module in the FUSE module 211. Then, the kernel module in the FUSE module 211 passes the file system operation request (for example, via the FUSE interface module) to the FUSE application in the user space. The FUSE application in the FUSE module 211 may forward the file system operation request to the backup server 220.

In some embodiments, the backup server 220 may include a data recovery module 221 and a data repository 222. The data repository 222 is configured to store the backup data (for example, the backup data 140-1, 140-2, 140-3, and the like as shown in FIG. 1A). The backup data may be stored in the data repository 222 in the same manner as shown in FIG. 1B. That is, the file may be stored in the data repository 222 after being subjected to pre-processing such as chunking, encryption and/or compression. Various chunks of the file can be indexed with hash values respectively. The data recovery module 221 may be connected to the FUSE module 211 via a network, for example, to receive a file system operation request from the FUSE module 211. The data recovery module 221 may perform a corresponding data recovery operation based on the file system operation request, so as to restore the target data requested by the file system operation request from the data repository 222.

In some embodiments, the target data requested by the file system operation request may be one or more chunks of a backup file, or metadata (e.g., a list of files in a directory of the file system) of one or more backup files. The data recovery module 221 may obtain the pre-processed (e.g., chunked, encrypted and/or compressed) target data from the data repository 222, and then perform post-processing (e.g., decompression, decryption, and/or chunk merging) opposite to the pre-processing to restore the target data. The data recovery module 221 may then send the restored target data to the FUSE module 211, so as to provide 202 to the data access entity 230 via the virtual file system 212 as a response to the file system operation request.

Figure 3:
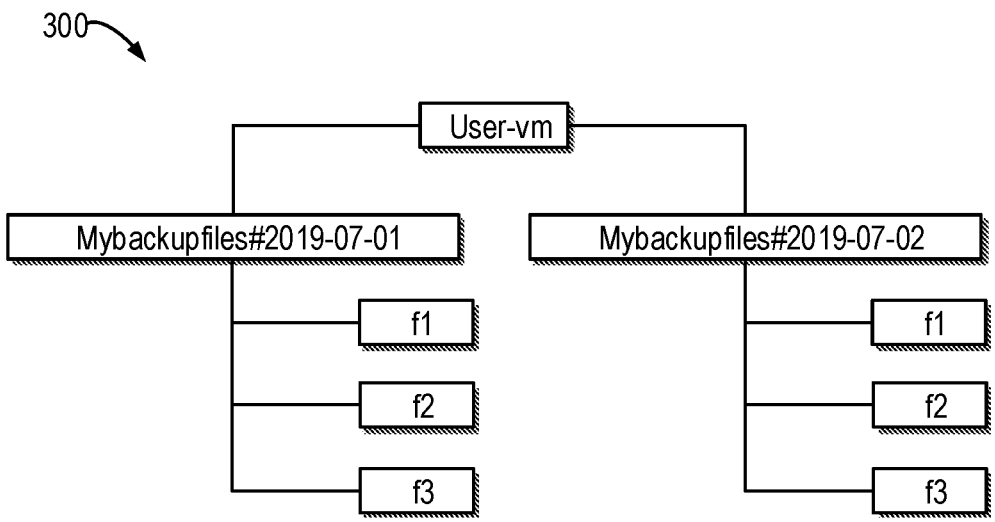
FIG. 3 illustrates a schematic diagram of an example directory structure of a virtual file system according to embodiments of the present disclosure.

In some embodiments, the virtual file system 212 may create, for the backup data corresponding to one backup task, a directory structure in the data repository 222. FIG. 3 illustrates a schematic diagram of an example directory structure 300 of a virtual file system according to embodiments of the present disclosure. In some embodiments, for the backup data corresponding to one backup task, an identifier of the backup client from which the backup data comes can be used as a name of a root directory, and an identifier of the backup data can be used as a name of a second-level directory, and the folder structure corresponding to the backup data can be mapped to contents in the second-level directory. In the example shown in FIG. 3, for example, the backup client "User-vm" contains three folders f1, f2, and f3. The backup client, for example, generated backup data named "Mybackupfiles#2019-07-01" on Jul. 1, 2019, and generated backup data named "Mybackupfiles#2019-07-02" on Jul. 2, 2019. When the data access entity 230 wants to browse the files of the backup client, the FUSE module 211 may parse the file system operation request and create second-level directories "Mybackupfiles#2019-07-01" and "Mybackupfiles#2019-07-02" in a root directory named "User-vm". The FUSE module 211 may further create three subdirectories f1, f2, and f3 under each second-level directory, as shown in the example directory structure 300.

Figure 4:
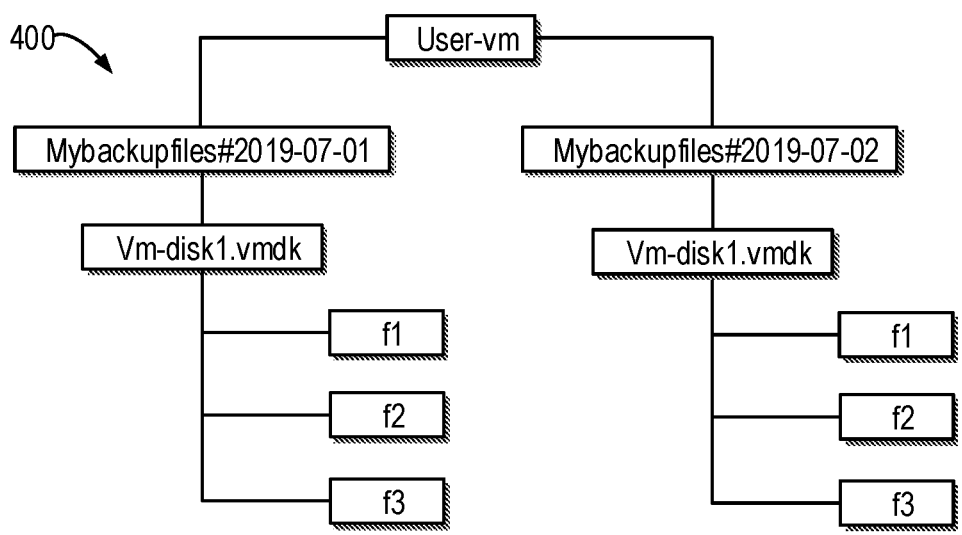
FIG. 4 illustrates a schematic diagram of an example directory structure of a virtual file system according to embodiments of the present disclosure.

In some embodiments, the backup data may be virtual machine backup data. That is, the backup object is a virtual disk. For this type of backup data, an identifier of the backup client from which the backup data comes can be used as a name of a root directory, an identifier of the backup data can be used as a name of a second-level directory and an identifier of the virtual disk can be used as a name of a third-level directory, and the folder structure in the virtual disk can be mapped to contents in the third level directory. For example, an example directory structure is shown as a directory structure 400 in FIG. 4.

Figure 5:
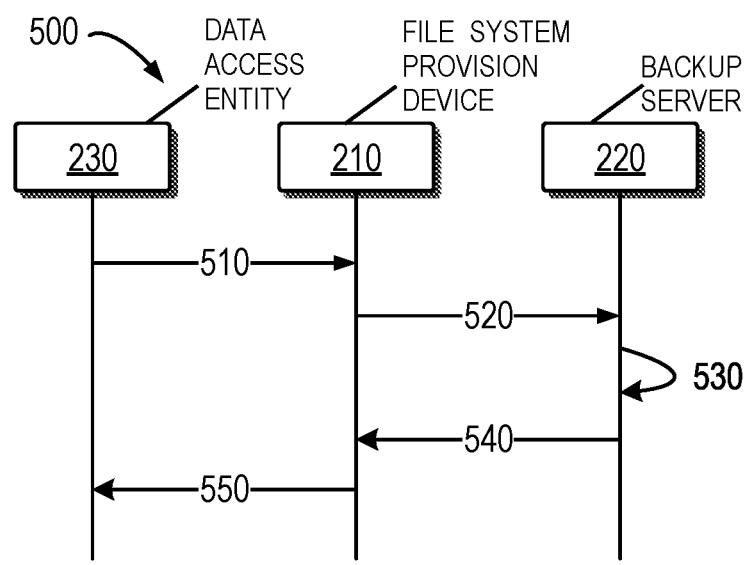
FIG. 5 illustrates an interaction diagram of an example process for accessing data according to embodiments of the present disclosure.

FIG. 5 illustrates an interaction diagram of an example process 500 for accessing data according to embodiments of the present disclosure. The process 500 involves the file system provision device 210, the backup server 220 and the data access entity 230 as shown in FIG. 2.

As shown in FIG. 5, when the data access entity 230 wants to browse or access backup data stored at the backup server 220, the data access entity 230 may send 510 to the file system provision device 210 a file system operation request for accessing target data.

In some embodiments, the file system operation request is to browse a file structure in a directory of the file system or read a part of a file that is backed up. That is, the target data requested by the file system operation request may be one or more chunks in a backup file, or metadata of one or more backup files (e.g., a list of files in a directory of the file system). In some embodiments, one or more files from the backup client may be stored at the backup server 220 (for example, the data repository 222 in the backup server 220) after being pre-processed. The pre-processing may include one or more of chunking, encryption, and compression.

As shown in FIG. 5, the file system provision device 210 may forward 520 the file system operation request to the backup server 220. In response to receiving the file system operation request, the backup server 220 (for example, the data recovery module 221 therein) may perform a corresponding data recovery operation 530 based on the file system operation request, so as to restore the target data requested by the file system operation request from the data repository 222.

In some embodiments, the data recovery module 221 may obtain the pre-processed (e.g., chunked, encrypted and/or compressed) target data from the data repository 222 and then perform post-processing (for example, decompression, decryption, and/or chunk merging) opposite to the pre-processing on the pre-processed target data so as to restore the target data. Since the data recovery can be performed in units of data chunks, embodiments of the present disclosure can implement finer-grained access to a backup file.

As shown in FIG. 5, the backup server 220 (for example, the data recovery module 221 therein) may send 540 the restored target data to the file system provision device 210. The file system provision device 210 may return 550 the target data to the data access entity 230 as a response to a file system operation request.

As can be seen from the above description, embodiments of the present disclosure propose a solution for accessing data to solve the above problems and/or other potential problems. This solution implements a virtual file system interface for backup data stored at a backup server. This interface allows other devices or applications to access data stored after being pre-processed through normal file system operations. This solution can achieve fine-grained access to backup files and can achieve high data access performance.

Embodiments of the present disclosure can be widely applied to various fields including, but not limited to, a data search field, a big data mining field, and a distributed storage field. For example, in the field of data search, the data access entity 230 may be implemented as a data search module to implement search and query of backup data and the like. For example, in the field of big data mining, the data access entity 230 may be implemented as a big data analysis module to achieve big data analysis for backup data by accessing the backup data. For example, in the field of distributed storage, the data access entity 230 may be implemented by a data node and/or a name node in a distributed file system (for example, a Hadoop file system). The data node may implement access to file data in the backup data and the name node can achieve access to the metadata in the backup data.

Compared with the traditional solution, embodiments of the present disclosure can achieve the following advantages that: (1) the user can view the list of backup files and quickly browse at least a part of the contents in a backup file even if the entire file is not restored; (2) it will not consume too many disk resources, because the target data is restored only when the user needs to access the target data; (3) it is easy to interface with an upstream backup system and/or other downstream systems to achieve easy access to contents of the backup file.

Figure 6:
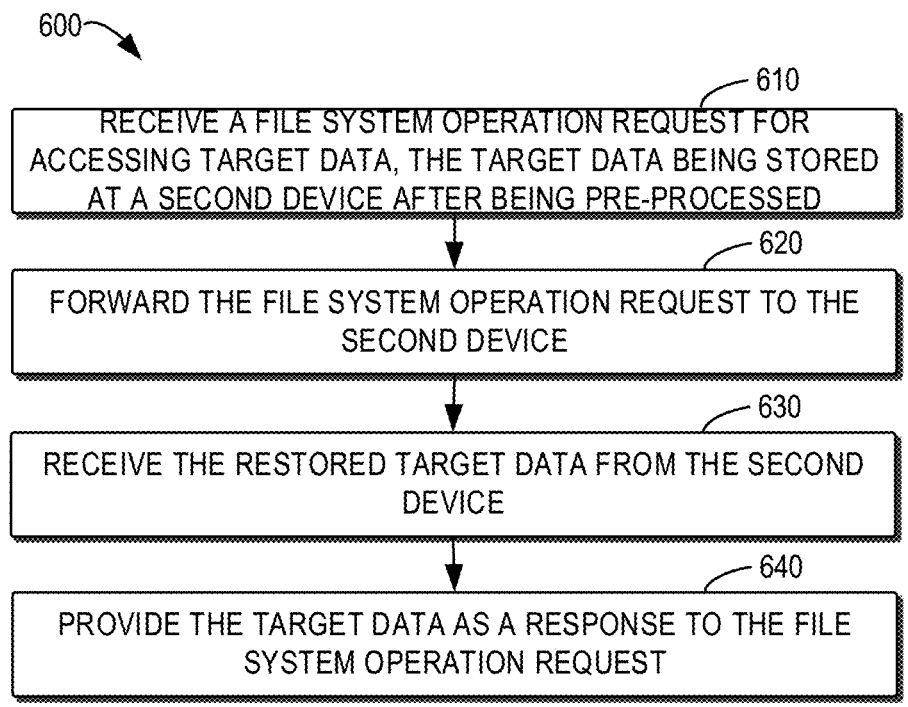
FIG. 6 illustrates a flowchart of an example method for accessing data according to embodiments of the present disclosure.

FIG. 6 illustrates a flowchart of an example method 600 for accessing data according to embodiments of the present disclosure. The method 600 may be performed at a file system provision device 210 (i.e., the "first device") as shown in FIG. 2. It is to be understood that the method 600 may include additional actions not shown and/or may omit some actions shown, and the scope of the present disclosure is not limited in this regard. The method 600 will be described in detail below with reference to FIG. 2.

At block 610, the first device 210 (for example, from the data access entity 230) receives a file system operation request for accessing target data, the target data being stored at the backup server 220 (that is, the second device) after being pre-processed, and the first device 210 providing a file system interface for data stored at the second device 220.

In some embodiments, the target data may include at least one of: at least a portion of a file backed up by a backup client (also referred to as a "third device") to the second device 220; and metadata of the file.

In some embodiments, the pre-processing includes at least one of: chunking, encryption, and compression.

At block 620, the first device 210 forwards the file system operation request to the second device 220, such that the target data is restored at the second device 220.

At block 630, the first device 210 receives the restored target data from the second device 220.

At block 640, the first device 210 provides (e.g., to the data access entity 230) the target data as a response to the file system operation request.

Figure 7:
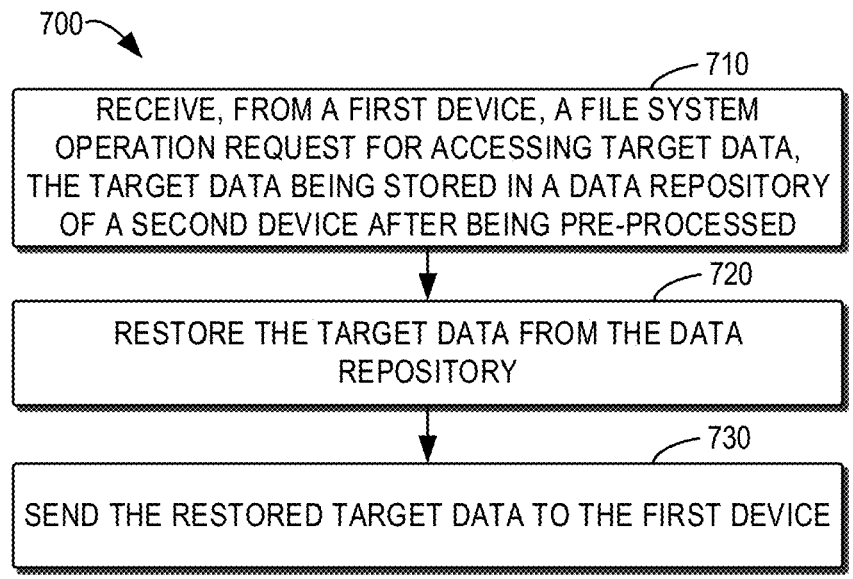
FIG. 7 illustrates a flowchart of an example method for accessing data according to embodiments of the present disclosure.

FIG. 7 illustrates a flowchart of an example method 700 for accessing data according to an embodiment of the present disclosure. The method 700 may be performed at the second device 220 as shown in FIG. 2. It is to be understood that the method 700 may include additional actions not shown and/or may omit some actions shown, and the scope of the present disclosure is not limited in this regard. The method 700 will be described in detail below with reference to FIG. 2.

At block 710, the second device 220 receives, from the first device 210, a file system operation request for accessing target data, the target data being stored in the data repository 222 of the second device 220 after being pre-processed, and the first device 210 providing a file system interface for data stored in the data repository 222.

In some embodiments, the target data may include at least one of: at least a portion of a file backed up by the third device to the second device 220; and metadata of the file.

In some embodiments, the pre-processing includes at least one of: chunking, encryption, and compression.

At block 720, the second device 220 restores the target data from the data repository 222.

In some embodiments, the restoring the target data comprises: obtaining the pre-processed target data from the data repository 222; and restoring the target data by performing post-processing opposite to the pre-processing on the target data.

At block 730, the second device 220 sends the restored target data to the first device 210.

Figure 8:
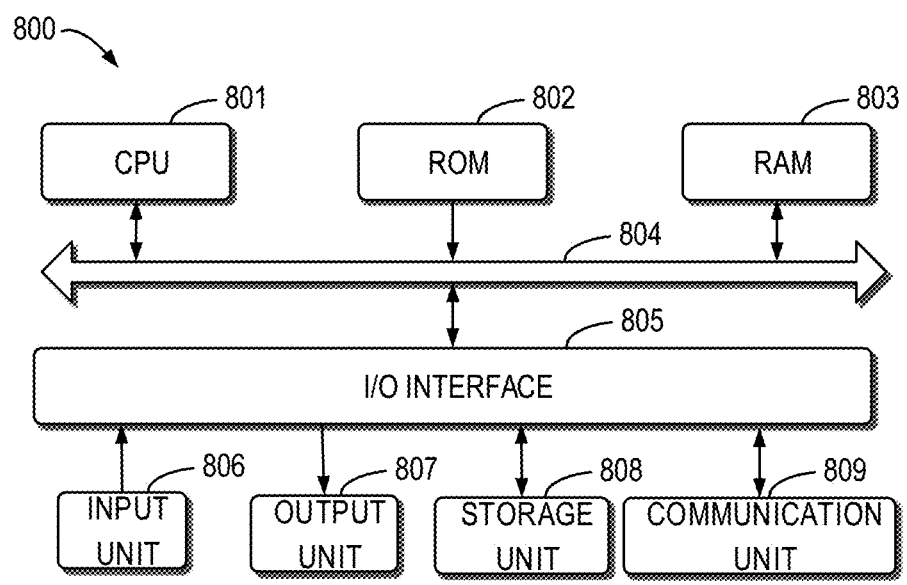
FIG. 8 illustrates a block diagram of an example device that can be used to implement embodiments of the present disclosure.

FIG. 8 illustrates a block diagram of an example device 800 that can be used to implement embodiments of the present disclosure. For example, the file system provision device 210 and/or the backup server 220 shown in FIG. 2 may be implemented by the device 800. As shown in FIG. 8, the device 800 includes a central processing unit (CPU) 801 which performs various appropriate actions and processing, based on computer program instructions stored in a read-only memory (ROM) 802 or computer program instructions loaded from a storage unit 808 to a random access memory (RAM) 803. The memory 803 stores therein various programs and data required for operations of the device 800. The CPU 801, the ROM 802 and the memory 803 are connected via a bus 804 with one another. An input/output (I/O) interface 805 is also connected to the bus 804.

The following components in the device 800 are connected to the I/O interface 805: an input unit 806 such as a keyboard, a mouse and the like; an output unit 807 including various kinds of displays and a loudspeaker, etc.; a storage unit 808 such as a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the method 600 and/or 700, can also be executed by the processing unit 801. For example, in some embodiments, the method 600 and/or 700 can be implemented as a computer software program tangibly included in the machine-readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method 600 and/or 700 as described above may be executed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/actions specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the functions/actions specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A method for accessing data, comprising:
creating, at a first device, a directory structure for backup data corresponding to one backup task, wherein the backup data comprises virtual machine backup data and creation of the directory structure includes:

naming a root directory based on an identifier of a backup client from which the backup data is received, naming a second-level directory based on an identifier of the backup data, naming a third-level directory based on an identifier of a virtual disk included in the backup data, and mapping contents in the third-level directory to a folder structure in the virtual disk;

storing the directory structure and the backup data in a data repository of a second device;

dynamically generating, at the first device, a virtual file system interface for the backup data stored by the second device, the virtual file system interface for viewing the directory structure and enabling devices and applications to access the backup data via normal file system operations;

receiving, at the first device and from a data access entity, a file system operation request associated with the virtual file system interface for accessing target data of the backup data, the target data being stored at the second device after being pre-processed, wherein the pre-processing comprises dividing the target data into a plurality of chunks and, for each of the plurality of chunks, calculating a hash value as an index to the chunk on the second device and compressing the target data to generate compressed target data, and wherein the target data comprises a portion that is less than all of a file backed up by a third device to the second device;

forwarding the file system operation request to the second device, such that the target data is restored at the second device by decompressing the compressed target data;

receiving the restored target data from the second device; and providing the target data as a response to the file system operation request.

2. The method of claim 1, wherein the target data further comprises metadata of the file.

3. The method of claim 1, wherein the pre-processing further comprises using encryption to encrypt the compressed target data.

4. The method of claim 1, wherein a name of at least one level of the directory structure includes an identifier of the third device.

5. The method of claim 1, wherein the second-level directory named based on an identifier of the backup data includes a date that the backup data was generated.

6. A method for accessing data, comprising:

receiving, from a first device and at a second device, a file system operation request for accessing target data, the target data being stored in a data repository of the second device after being pre-processed, and the first device providing a file system interface for data stored in the data repository, wherein the pre-processing comprises dividing the target data into a plurality of chunks and, for each of the plurality of chunks, calculating a hash value as an index to the chunk on the second device and compressing the target data to generate compressed target data, and wherein the target data comprises a portion that is less than all of a file backed up by a third device to the second device, wherein the file system operation request is received from the first device responsive to a user interaction with a virtual file system interface for backup data stored in the data repository of the second device, the virtual file system interface for viewing a directory structure of the backup data and enabling devices and applications to access the backup data via normal file system operations, the directory structure created by the first device and stored in the data repository of the second device, wherein the backup data comprises virtual machine backup data and the directory structure includes:

a root directory named based on an identifier of a backup client from which the backup data was received, a second-level directory named based on an identifier of the backup data, and a third-level directory named based on an identifier of a virtual disk included in the backup data, wherein contents in the third-level directory are mapped to a folder structure in the virtual disk;

restoring the target data from the data repository by decompressing the compressed target data; and sending the restored target data to the first device.

7. The method of claim 6, wherein the target data further comprises metadata of the file.

8. The method of claim 6, wherein the pre-processing further comprises using encryption to encrypt the compressed target data.

9. The method of claim 6, wherein restoring the target data further comprises:

obtaining the pre-processed target data from the data repository; and restoring the target data by performing post-processing opposite to the pre-processing on the target data.

10. The method of claim 6, wherein the second-level directory named based on an identifier of the backup data includes a date that the backup data was generated.

11. An electronic device, comprising:

at least one processing unit;

at least one memory coupled to the at least one processing unit and storing instructions for execution by the at least one processing unit, the instructions, when executed by the at least one processing unit, causing the device to perform acts comprising:

creating, at a first device, a directory structure for backup data corresponding to one backup task, wherein the backup data comprises virtual machine backup data and creation of the directory structure includes:

naming a root directory based on an identifier of a backup client from which the backup data is received, naming a second-level directory based on an identifier of the backup data, naming a third-level directory based on an identifier of a virtual disk included in the backup data, and mapping contents in the third-level directory to a folder structure in the virtual disk;

storing the directory structure and the backup data in a data repository of a second device;

dynamically generating, at the first device, a virtual file system interface for the backup data stored by the second device, the virtual file system interface for viewing the directory structure and enabling devices and applications to access the backup data via normal file system operations;

receiving a file system operation request associated with the virtual file system interface for accessing target data of the backup data, the target data being stored at the second device after being pre-processed, wherein the pre-processing comprises dividing the target data into a plurality of chunks and, for each of the plurality of chunks, calculating a hash value as an index to the chunk on the second device and compressing the target data to generate compressed target data, and wherein the target data comprises a portion that is less than all of a file backed up by a third device to the second device;

forwarding the file system operation request to the second device, such that the target data is restored at the second device by decompressing the compressed target data;

receiving the restored target data from the second device; and providing the target data as a response to the file system operation request.

12. The electronic device of claim 11, wherein the target data further comprises metadata of the file.

13. The electronic device of claim 11, wherein the pre-processing further comprises using encryption to encrypt the compressed target data.

14. The electronic device of claim 11, wherein a name of at least one level of the directory structure includes an identifier of the third device.

15. The electronic device of claim 11, wherein the second-level directory named based on an identifier of the backup data includes a date that the backup data was generated.

16. An electronic device, comprising:
at least one processing unit;
at least one memory coupled to the at least one processing unit and storing instructions for execution by the at least one processing unit, the instructions, when executed by the at least one processing unit, causing the device to perform acts comprising:
receiving, from a first device, a file system operation request for accessing target data, the target data being stored in a data repository of the electronic device after being pre-processed, and the first device providing a file system interface for data stored in the data repository, wherein the pre-processing comprises dividing the target data into a plurality of chunks and, for each of the plurality of chunks, calculating a hash value as an index to the chunk on the electronic device and compressing the target data to generate compressed target data, and wherein the target data comprises a portion that is less than all of a file backed up by a third device to the electronic device, wherein the file system operation request is received from the first device responsive to a user interaction with a virtual file system interface for backup data stored in the data repository of the electronic device, the virtual file system interface for viewing a directory structure of the backup data and enabling devices and applications to access the backup data via normal file system operations, the directory structure created by the first device and stored in the data repository of the electronic device, wherein the backup data comprises virtual machine backup data and the directory structure includes:
a root directory named based on an identifier of a backup client from which the backup data was received,
a second-level directory named based on an identifier of the backup data, and
a third-level directory named based on an identifier of a virtual disk included in the backup data, wherein contents in the third-level directory are mapped to a folder structure in the virtual disk;
restoring the target data from the data repository by decompressing the compressed target data; and
sending the restored target data to the first device.

17. The electronic device of claim 16, wherein the target data further comprises metadata of the file.

18. The electronic device of claim 16, wherein the pre-processing further comprises using encryption to encrypt the compressed target data.

19. The electronic device of claim 16, wherein restoring the target data comprises:
obtaining the pre-processed target data from the data repository; and
restoring the target data by performing post-processing opposite to the pre-processing on the target data.

20. The electronic device of claim 16, wherein the second-level directory named based on an identifier of the backup data includes a date that the backup data was generated.

* * * * *